United States Patent [19]

Budahn

[11] Patent Number: 4,820,540

[45] Date of Patent: Apr. 11, 1989

[54] METHOD AND APPARATUS FOR CONTINUOUSLY PRODUCING CHEESE UTILIZING BRINE SALTING

[76] Inventor: Burnell E. Budahn, Norwood, Minn. 55368

[21] Appl. No.: 126,622

[22] Filed: Nov. 30, 1987

[51] Int. Cl.[4] .................. A23C 19/024; A23C 19/064; A23C 19/072; A01J 11/00

[52] U.S. Cl. .................. 426/582; 426/491; 426/495; 99/453; 99/459; 99/457

[58] Field of Search .............. 426/582, 491, 495; 99/456, 457, 459, 452, 453, 458

[56] References Cited

U.S. PATENT DOCUMENTS

| | | | |
|---|---|---|---|
| 2,494,638 | 1/1950 | Stine | 99/116 |
| 2,564,374 | 8/1951 | Roland | 99/116 |
| 2,733,148 | 1/1956 | Russo | 99/116 |
| 2,796,351 | 6/1957 | Walter et al. | 99/116 |
| 2,846,767 | 8/1958 | Hensgen et al. | 31/48 |
| 2,850,390 | 9/1958 | Irvine et al. | 99/116 |
| 2,864,704 | 12/1958 | Feutz, Jr. | 99/116 |
| 2,868,651 | 1/1959 | Manwaring | 99/116 |
| 2,871,126 | 1/1959 | Smith et al. | 99/116 |
| 2,907,109 | 10/1959 | Palmer | 31/14 |
| 2,917,827 | 12/1959 | Lankford | 32/46 |
| 2,980,538 | 4/1961 | Wolf | 99/116 |
| 2,989,400 | 6/1961 | Baumann | 99/116 |
| 3,046,140 | 7/1962 | Hermann | 99/116 |
| 3,060,575 | 10/1962 | Czulak | 31/47 |
| 3,078,169 | 2/1963 | McCadam | 99/116 |
| 3,078,170 | 2/1963 | Leber | 426/582 |
| 3,154,002 | 10/1964 | Budahn | 99/243 |
| 3,156,567 | 11/1964 | Budahn | 99/115 |
| 3,449,127 | 6/1969 | Budahn | 99/115 |
| 3,518,094 | 6/1970 | Nikolic | 99/116 |
| 3,592,124 | 7/1971 | Pontecorvo et al. | 99/243 |
| 3,636,630 | 1/1972 | Budahn | 31/89 |
| 3,695,893 | 10/1972 | Czulak et al. | 99/116 |
| 3,750,286 | 8/1973 | Whelan | 99/455 |
| 3,798,340 | 3/1973 | Reinbold et al. | 426/361 |
| 3,910,174 | 10/1975 | Nelles | 99/452 |
| 4,068,014 | 1/1978 | Heimbrach | 426/582 |
| 4,172,900 | 10/1979 | Dooley | 426/38 |
| 4,197,322 | 4/1980 | Middleton | 426/36 |
| 4,202,909 | 5/1980 | Pederson, Jr. | 426/239 |
| 4,206,238 | 6/1980 | Rothenbuhler | 426/36 |
| 4,217,818 | 8/1980 | Hazen | 99/456 |
| 4,226,888 | 10/1980 | Siecker | 426/36 |
| 4,232,050 | 11/1980 | Rule et al. | 426/582 |
| 4,242,362 | 12/1980 | Grigsby et al. | 426/40 |
| 4,244,286 | 1/1981 | Rust | 99/459 |
| 4,244,972 | 1/1981 | Johnson | 426/38 |
| 4,244,983 | 1/1981 | Baker | 426/582 |
| 4,248,578 | 2/1981 | Worden | 425/220 |
| 4,300,446 | 11/1981 | Hazen | 99/461 |
| 4,309,941 | 1/1982 | Brockwell | 426/491 |
| 4,332,831 | 6/1982 | Rust | 426/582 |
| 4,339,468 | 7/1982 | Kielsmeier | 426/582 |
| 4,352,826 | 10/1982 | Pearline et al. | 426/39 |
| 4,362,749 | 12/1982 | Sozzi | 426/36 |
| 4,372,979 | 2/1983 | Reinbold | 426/36 |
| 4,374,152 | 2/1983 | Loter | 426/39 |
| 4,379,175 | 4/1983 | Baker | 426/582 |
| 4,382,971 | 5/1983 | Thompson | 426/323 |
| 4,390,560 | 6/1983 | Koide et al. | 426/582 |
| 4,397,878 | 8/1983 | Koide et al. | 426/40 |
| 4,397,926 | 8/1983 | Galal et al. | 426/582 |
| 4,434,184 | 2/1984 | Kharrazi | 426/40 |
| 4,448,116 | 5/1984 | Muzzarelli | 99/460 |
| 4,457,386 | 10/1985 | Chambers et al. | 426/583 |
| 4,482,575 | 11/1985 | Olds | 426/582 |
| 4,497,836 | 2/1985 | Marquardt et al. | 426/239 |
| 4,543,261 | 9/1985 | Harmon et al. | 426/271 |
| 4,560,560 | 12/1985 | Narimatsu et al. | 426/38 |

Primary Examiner—Marianne Cintins
Assistant Examiner—Helen Pratt
Attorney, Agent, or Firm—Schroeder & Siegfried

[57] ABSTRACT

Appparatus and method for continuously manufacturing cheese from cheese curd via mechanical means in which the curd is drained, matted and cheddared while carried upon a pair of conveyors running in opposite directions; milled and discharged upon a third conveyor, and sprayed while on the third conveyor at periodic intervals over a period of 12–20 minutes with a saturated water-based brine having a temperature of 80° F. and pH of 5.1, the curd being permitted to rest undisturbed initially upon the third conveyor for a period of several minutes and being therafter agitated to distribute the brine more uniformly therethrough and being maintained throughout the process at a temperature of substantially 98° F. Approximately eighteen (18) gallons of said brine is being uniformly sprayed upon each 1000 lbs. of curd.

28 Claims, 1 Drawing Sheet

METHOD AND APPARATUS FOR CONTINUOUSLY PRODUCING CHEESE UTILIZING BRINE SALTING

BACKGROUND OF THE PRIOR ART

In recent years, the production of cheese has tended to become mechanical, as is witnessed by my earlier U.S. Pat. Nos. 3,154,002; 3,156,567; 3,449,127 and 3,636,630 and the Brockwell U.S. Pat. No. 4,309,941. The ultimate goal, of course, has been to develop machinery which will produce a desired cheese of high uniformity in texture, flavor and quality with the desired salt and moisture content, untouched by human hands in the making. Although progress has been made, all of the heretofore known methods and devices have fallen far short of the goal of their designers, particularly in the area of the need and desire for uniform salting.

It has been recognized throughout the industry that brine salting of cheese should yield preferable results, if it can be accomplished without undue loss of both salt and cheese product and without undue expense and difficulties in the operation. Early attempts along this line were made, as witnessed by the McCadam U.S. Pat. No. 3,078,169, but none have proved satisfactory. In fact, they have proved to be so unsatisfactory that the industry has tended to give up on the problem and to assume that it is not capable of being solved in a practical manner, if at all.

Most such methods and devices, such as that disclosed in the McCadam U.S. Pat. No. 3,078,169 incur substantial loss of both cheese product and salt, which makes its implementation prohibitive. Some utilize high temperatures which inevitably produce high fat losses. Most have returned to efforts to utilize dry salt in an improved manner. My own patent, U.S. Pat. No. 3,636,630 is directed toward that end, since manual sprinkling of salt on the curd as generally practiced has been not only unsanitary but haphazard by virtue of unevenness of distribution and of absorption by the curd.

The application of dry salt also introduces highly undesirable foreign solids, which are impurities contained within the salt. Uneven distribution of salt content makes it impossible to produce a product which is uniform in either moisture content, texture or flavor. Mechanical application of dry salt, although an improvement over manual application, is nevertheless incapable of entirely precluding occasional local, non-uniform salt and moisture content, texture and flavor.

No one has heretofore come forward with either a method or apparatus which is commercially successful for utililizing brine salting on a production line basis, or on any basis, for that matter. Some, such as Brockwell, U.S. Pat. No. 4,309,941 outline the problems involved and seek to minimize costs involved in producing machinery for the continuous production of cheese. While such motives are praiseworthy, the ultimate goal is not reached unless a truly high grade cheese will result from following the construction and methods disclosed therein. The machine shown in the above Brockwell patent cannot produce such a cheese. The use of a whey-based brine as taught by the above patent, for example, is unsatisfactory because of the tremendous build-up of bacteria and acidity when the whey is placed in a tank with solid salt to produce the needed brine; also, the required salt content within the curd cannot be obtained by a brief application of brine, such as is shown in the above Brockwell and McCadam patents. Ideally, curd should be allowed to soak in brine, but that is commercially impractical.

The percentage of salt retention by the curd is an important cost consideration in the use of brine for salting purposes. Since brine which is not absorbed, cannot be collected and applied repeatedly, substantial cost is involved unless a relatively high percentage of absorption is obtained in the application of brine to the curd. The method and apparatus disclosed herein successfully solves the above problems and have proved highly successful for use on a production line basis to produce cheese of the highest quality at a substantial profit, provided by an improved resultant product as well as actual out-of-pocket savings in its manufacture.

BRIEF SUMMARY OF THE INVENTION

The apparatus and methods disclosed herein are presently being used in the manufacture of cheese on a production line basis and the cheese so produced has the highest quality rating provided by the U.S. Government. We produce an average of 12000–13000 lbs. of salted cheese curd per hour and find that the cheese produced therefrom is of the highest quality with respect to salt and moisture content, texture and flavor and consistently receives the highest ratings of the U.S. Government therefor.

The whey separating, matting and cheddaring functions and apparatus of my invention have been previously shown in my U.S. Pat. No. 3,636,630, the contents of which are incorporated herein by reference thereto, except that the stainless steel conveyor belts are now perforated to facilitate drainage of the whey from the curd. The salting methods, functions and apparatus shown herein, however, are new and, for the first time, provides a commercially acceptable means for utilizing brine to accomplish proper salting of the cheese curd, preparatory to hooping. I accomplish this longsought function by repeatedly applying controlled amounts of saturated water-based brine, having a controlled temperature of 80° F. and pH of 5.1, to the cheese curd at regular intervals over a prolonged period such as 12–20 minutes at a rate approximating four gallons per minute.

I apply the brine initially about three minutes after the cheddared curd has been milled. This is accomplished by spraying the saturated water-based brine in sheet form upon the curd at substantially equidistantly spaced locations, as it moves along on a sixty (60') foot perforated stainless steel mellowing belt over a distance of approximately 21–34 feet and during a period of time approximating twenty (20) minutes. By doing this, I obtain approximately 60%–70% retention of the salt within the curd, the balance of the brine being discarded because its re-use would adversely affect the quality of cheese produced therefrom.

After the final application of brine to the curd, the latter moves along with the conveyor to its final destination as it mellows. I provide rotary agitators at spaced locations along the length of the perforated sixty foot stainless steel belt conveyor. These agitators engage and mix the curd to facilitate the uniform application of brine to the exterior of each discrete particle of curd and thereby provide uniform absorption and salt content.

As stated, my new method and apparatus for continuously making cheese through the use of brine salting includes the spraying of saturated water-based brine, having a temperature of 80° F. and a pH of 5.1, in continuous sheet form over the milled curd at periodic intervals over a period of 12-20 minutes, as it moves along on a conveyor. The brine is applied at a rate approximating 18 gallons per 1000 lbs. of curd. This results in a salt retention of 60%-70% which permeates the curd effectively and uniformly to produce the desired proportion and distribution of salt content throughout, while reducing the costs.

The curd is first permitted to "heal" for a period approximating three minutes, after it is milled and before it is so sprayed. The temperature of the curd is maintained at 98° F. throughout the process from the initial curd-draining through the matting, fusing, cheddaring, salting and mellowing stages. Prior to the milling and salting, the curd is drained, matted and fused, turned over and cheddared as it moves along upon a pair of cooperating vertically spaced perforated stainless steel conveyor belts. Upon completion of the cheddaring, at the end of the second conveyor, the curd is milled and thereafter salted as described above as it moves along upon a third perforated stainless steel conveyor.

BRIEF DESCRIPTION OF THE DRAWINGS

A detailed description of one preferred embodiment of the METHOD AND APPARATUS FOR CONTINUOUSLY PRODUCING CHEESE UTILIZING BRINE SALT is hereafter described with specific reference being made to the drawings, in which.

DETAILED DESCRIPTION OF THE INVENTION

Figure 1:
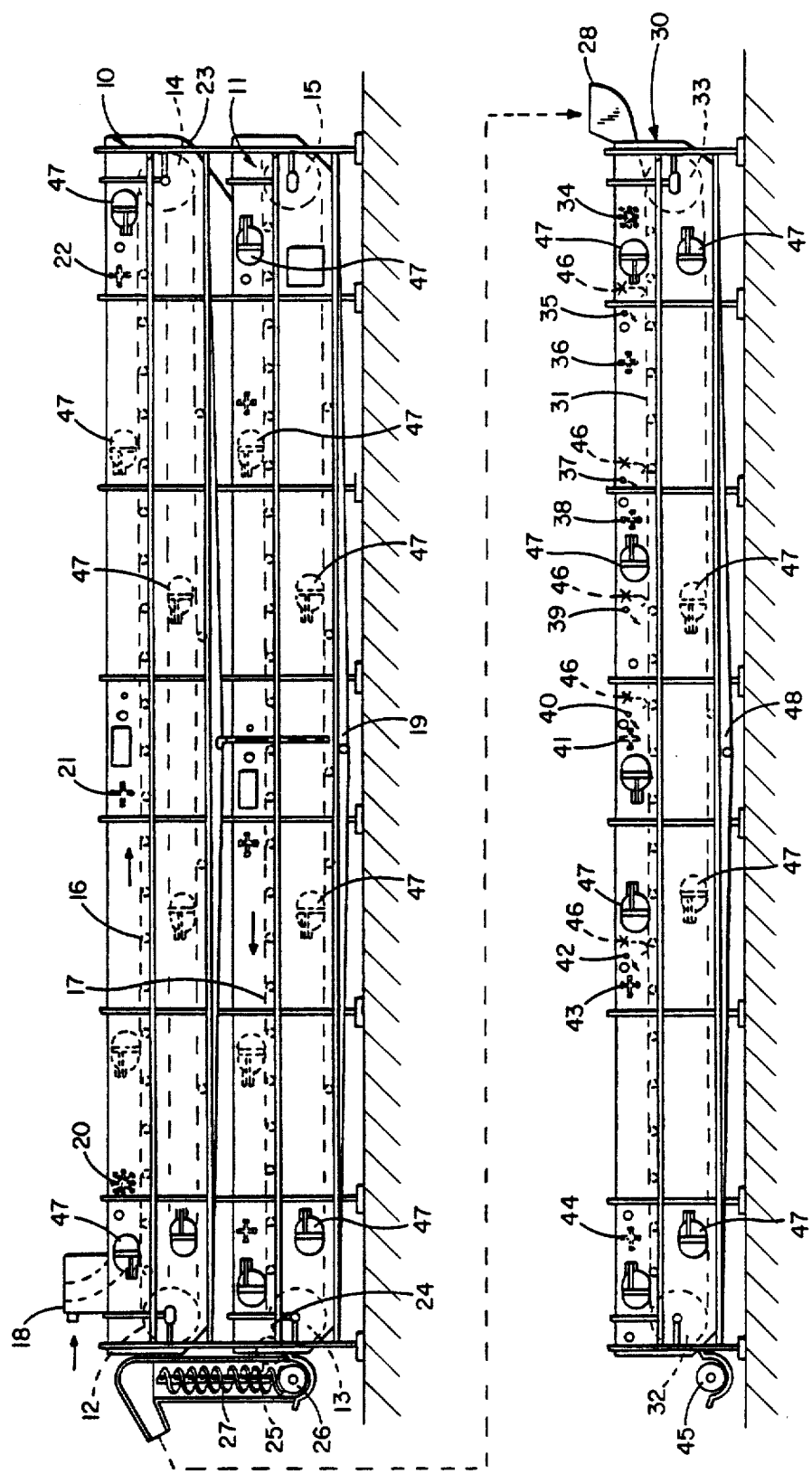
FIG. 1 is a diagrammatic side elevational view of the cheese making apparatus of my invention, with the interior thereof shown in broken lines within the side paneling which encloses the former.

The embodiment of my invention, as shown diagramatically in FIG. 1, is constructed in many respects in accordance with my U.S. Pat. No. 3,636,630. Therefore, in the event the construction of any portion of my machine as described herein is incomplete, reference may be had to said patent for further guidance with respect thereto.

As shown in FIG. 1, my cheese making apparatus includes a pair of vertically stacked conveyors which handle the curd during its matting and cheddaring processes. These conveyors have been identified by the general numerals 10 and 11, respectively. Each of these conveyors is sixty feet long and is characterized by a stainless steel perforated continuous belt conveyor which is approximately five feet wide and extends around a pair of rollers at each end, at least one of which is powered. These rollers are identified by numerals 12,14 and 13,15, respectively. The top rung of pair 12,14 runs in a direction toward the right, as viewed in FIG. 1, while the top rung of pair 13, 15 runs in the opposite direction. The conveyor belts have been identified by numerals 16,17.

Each of the conveyors 10,11 have whey collecting and conveying structure incorporated therein in close association with its belt conveyor 16,17, respectively, similar to that shown in my U.S. Pat. No. 3,636,630. Each of the conveyors 10,11 have upstanding side walls at its sides beneath which the conveyor passes as it carries the curd along, as described in said patent. The distance between these side walls widens slightly from its receiving end to its discharge end so as to permit the curd to stretch transversely and thereby facilitate drainage of the whey from the curd.

Stainless steel sidewalls surround the conveyors 10 and 11 in almost their entirety and steam is released therewithin so as to maintain the curd on the conyeyors at an even temperature of 90° F. This temperature is maintained throughout the passage of the curd across these two conveyors.

The raw curd is developed in separate vats in a manner well known in the art, prior to its introduction upon the conveyors 10, 11. Each vat is connected via a valved conduit (not shown) to a curd and whey separator 18, such as shown in my U.S. Pat. No. 3,636,630 whereby the majority of the whey is separated and drained away to the whey collector 19. The drained curd is deposited upon the front end of conveyor 10 and leveled to a uniform depth of 5-6 inches by a powered rotary leveler and agitator 20. As the curd moves with the conveyor 10, it commences to mat and drain additionally. Powered rotary agitators such as indicated by the numerals 21 and 22 are located along the path of the curd and agitate and mix the same, thereby facilitating further drainage.

The conveyor 10 is sixty feet long and travels its full length in approximately 45 minutes. At its discharge end there is an inverter plate 23 which engages the mat of curd which is formed by the time the curd reaches that point, and inverts same so that its under surface faces upwardly as it is received by conveyor 11.

Conveyor 11 also has sideboards similar to those described above and which are slightly more widely spaced as the discharge end of the conveyor is approached. Again, this facilitates drainage of whey from the curd. Conveyor 11 runs slightly faster than conveyor 10, running at about 40-45 minutes per length of the conveyor. The slightly faster rate of progress tends to stretch the mat of curd as it is received, which further facilitates drainage of whey from the curd. The curd cheddars as it moves slowly along with the conveyor 11 until it reaches the discharge end 24 of the latter in a matted form.

At the discharge end 24 of conveyor 11, I have provided a means 25 for milling the curd into discrete pieces of approximately $\frac{3}{8}''\times\frac{3}{8}''\times 2''$ dimensions. Milling apparatus such as shown in my above patent or any other conventional milling machine may be utilized so long as it cuts the matted curd into small discrete pieces such as described above. Up to this point, the methods which I have described are old and well known in the art, as evidenced by my above patent and others.

The discharged milled pieces of curd are fed into a horizontal auger 26 which carries same into an upright auger 27 by means of which the milled curd is discharged into a receiving chute 28 of a third and adjacent conveyor 30. This conveyor 30 is constructed much like the conveyors 10,11 in that it is sixty (60') feet long, has a five (5') foot wide perforated stainless steel conveying belt 31, and end rollers 32,33, one of which is powered. The perforations within each of the three conveyors are approximately 1/16" in diameter, distributed uniformly at about fifteen (15) to twenty (20) in number per square inch. The receiving chute 28 is at the forward end of the conveyor belt 31 and discharges the curd it receives upon the upper surface of that belt. The belt 31 travels at a uniform rate slightly faster than the other two conveyors, in that it moves the length of the conveyor frame in 30-35 minutes.

The milled curd is leveled by a powered rotary leveler or agitator 34 as it is deposited upon the belt 31 into a uniform layer of about 5" in depth. Thereafter, it is permitted to remain undisturbed upon the belt 31 for a distance of approximately eight (8') feet so as to heal. During this healing period, the curd pieces are additionally drained of whey, the curds shrink somewhat, and the body of the curd becomes more firm. As a result, the curd becomes more receptive to the absorption of salt through a brine medium. It will be seen that the condition of the curd may cause the absorption rate of brine to vary.

Spaced along the conveyor belt 31 directly thereabove are a plurality of brine sprayer headers, each of which carry three #3 brine spray nozzles which are spaced transversely of the belt so as to cover the entire width of the belt with a sheet of brine spray approximately ¼" thick and 5' wide. Each of the nozzles is a Floodjet Nozzle having a #3 orifice of 0.091 inch and can be obtained from Spraying Systems at Schmale Road, Wheaton, Ill. 60187. The first header 35 is located approximately 6'-8' from the axis of the front drive roller 33 and is directed rearwardly and downwardly so as to apply to the curd, as it moves along thereunder with the belt 31, a transverse sheet of water-based brine spray.

A second powered rotary agitator 36 is positioned just rearwardly of the brine header 35, so that at least some of its brine spray will strike the agitator arms of the agitator 36. The action of the agitator mixes the curd and facilitates a uniform application of the brine to the individual pieces of curd as the latter moves along with the belt 31, so that substantially all surfaces of each discrete piece will be coated with the brine spray.

A second brine spray header 37 is located approximately 6' behind the spray header 35 and is directed and located similarly to the nozzles of the header 35 and with respect to a third powered rotary agitator 38.

A third brine spray header 39 is located approximately 6' rearwardly of the spray header 37 and has its nozzles directed and located similarly to the nozzles of the header 37 relative to its adjacent agitator. It will be seen that an agitator is disposed just rearwardly of the nozzles of each brine spray header and functions to engage and mix the curd to ensure an even application of the brine to the individual discrete pieces of curd, in order to thereby provide a uniform application of brine to the curd and consequently ensure uniform and maximum absorption of the brine. The construction of these agitators may be patterned after those shown in U.S. Pat. No. 4,309,941, which is hereby incorporated herein by reference thereto.

A fourth brine spray header 40 has its nozzles located, because of constructional limitations, approximately 7' rearwardly of the header 39. The nozzles of the header 40 are directed and located similarly to the nozzles of the other headers with respect to a fourth powered rotary agitator 41. As indicated, I would prefer a distance of only six feet between the headers 39 and 40 but in the construction shown, structural limitations caused me to shift position of the header 40.

A fifth brine spray header 42 is located, as shown, rearwardly of the header 40 a distance of about 10'-14', again for structural convenience. A fifth powered rotary agitator 43 is disposed just rearwardly of the header 42. It will be seen that each of the agitators, with the exception of agitator 34, is located adjacent to the nozzles of a brine spray header in substantially the same relationship and performs the same function of mixing the curd so as to obtain uniform application of water-based brine to the discrete particles of curd.

A final powered rotary agitator 44 is located adjacent the discharge of the conveyor belt 31 into a transfer auger 45 which conveys the salted curd to a waiting container or hoop (not shown).

From the above, it will be seen that the various sets of spray nozzles are preferably located approximately 6' apart and extend along the forward half of the conveyor 30 at spaced locations therealong so as to apply the brine spray at regular intervals over an extended period of time approximating 14-20 minutes. The last brine spray header 42 is located more rearwardly relative to the others and, when conditions are optimum for brine absorption by the curd, may, upon occasion, not be needed and can then be shut off to conserve brine.

A plurality of pivotally mounted sensors 46 are mounted directly above the conveyor belt 31 for swinging movement about an axis normal to the length of the belt 31 in position to engage and slide upwardly over the curd, as the latter moves with belt 31. Each of these sensors is connected in controlling relation to a valve (not shown) which controls the flow of brine spray to the immediately following spray header nozzles. Thus, when there is no curd upon the belt 31, the sensors will hang vertically as shown, and the valve will be closed to effectively shut off the flow of brine through the header and its nozzles. When curd is disposed upon the belt beneath the sensor, the latter will be angulated off vertical in accordance with the depth of the curd to thereby hold the valve controlling the supply of brine under pressure in partially or entirely open position so as to cause brine to be sprayed upon the curd. In this manner, I limit the loss of brine which would otherwise occur whenever the supply of curd upon the belt 31 is interrupted and proportion the amount of brine dispensed to the depth of the curd.

The housing which encases each of the three conveyors 10, 11 and 30 has a plurality of spaced access doors 47 by means of which an operator can gain access to the interior. Also, the conveyor 30 is provided with whey collector means 48 similar in construction to that shown in U.S. Pat. No. 3,636,630, or the Brockwell U.S. Pat. No. 4,309,941. The three conveyors carry a total of approximately 20,000-22,000 lbs. of curd at any given time and thus, each belt carries approximately 6,500-7,000 lbs. of curd at any given time. Approximately, two hours of time lapses during the period commencing with a given supply of curd being deposited upon belt 16 and terminating when that curd is discharged from belt 30 into auger 45. We find that with the above machine, we can process approximately 10,000-12,000 lbs. of curd each hour (approximately 220 lbs. per minute), with a highly improved resultant product and at a substantial saving.

The brine which I utilize is water-based, supersaturated, and has a temperature of 80° F. and a pH of 5.1. It is produced by mixing dry salt with water and an appropriate amount of acid found acceptable for the making of cheese such as muriatic acid, sulphuric acid, or phosphoric acid. I prefer the use of muriatic acid. Since the pH of water varies, the amount of acid required also varies.

The brine is mixed with an excess of salt and is filtered before it is transferred into a pressurized tank which is connected to the various brine spraying headers 35, 37, 39, 40 and 42. It is important that the brine be at a temperature of approximately 80° F. at the time of its application to the curd.

As indicated, the brine is water-based. This is important because, unlike whey, it has no solid particles therewithin. As a result, the brine is more readily absorbed and the whey is more readily expelled from the individual curds. Also, water does not develop bacteria, as does whey, and thus the accompanying problems of such bacteria are avoided.

The brine is applied at a uniform rate and is sprayed across the entire width of the bed of curds which is about 5'. As indicated, it is applied in sheet form, the sheet being relatively thin, such as approximately ¼". Thus, the brine is sprayed upon the curd by each set of spray nozzles over a relatively brief period of time. Since conveyor 30 travels two feet each minute, it will travel ¼" in 1/96 of one minute, or approximately 0.6 of one second. Thereafter, the brine which has been sprayed over the curd will be agitated and given an opportunity to be absorbed by the curd until the latter reaches the point of application of the next set of nozzles and brine spray header which is approximately 6' downstream. Thus the brine is sprayed upon the individual pieces of curd at approximately 3 minute intervals as they move with the conveyor belt 31 along the major distance of the length of the latter.

I prefer to utilize light pressure approximating 5 p.s.i. within the brine source. With the nozzles specified hereinbefore, I spray approximately 18 gallons of supersaturated brine upon each 1000 lbs. of curd. This means that I apply approximately four gallons of such supersaturated brine per minute, given the rate of movement and depth of the curd as described herein.

As indicated hereinabove, the treatment of the curd and the apparatus by means of which the curd is matted, drained and cheddared, as described above relative to conveyors 10 and 11 are essentially prior art. Commencing with conveyor 30, however, both the apparatus and methods utilized are new. The curd is permitted to heal during its travel over the first 6-8' of the conveyor in order to shrink the body of the curd, expelling whey, and the body of the curd becomes more firm and receptive to the absorption of brine. Thereafter, the sheet of spray from brine spray header 35 is encountered by the curd as it passes therethrough while upon the conveyor 35. Immediately thereafter, the curd is agitated by agitator 36 so as to mix the curd and ensure that all surfaces of each piece of curd receives some of the brine thereon. The excess of brine is collected via the brine collector 48 and, since its amount is relatively small and is contaminated with whey, it is discarded. This process is repeated each time the curd passes one of the brine spray headers and moves on to the next, which is about every three minutes. By the time the curd has passed the header 42 and absorbed the brine received thereat, the curd will have absorbed sufficient brine so that its salt content will have reached the optimum salt content which is 1.7%-1.8% by weight.

I have discovered that if supersaturated salt brine with a water base and having a temperature of 80° F. and a ph of 5.1 is applied periodically as described herein, we can attain the relatively high salt absorption rate of 60%-70%. This is much higher than has heretofore been attainable on a commercial basis and obviates one of the big objections to attempts to utilize brine salting in that heretofore so much of the salt was wasted that the cost was prohibitive. Also, it has not heretofore been possible to feasibly obtain, commercially, the optimum salt content of 1.8%. It is apparent that the 80° F. temperature of the supersaturated brine is important because I have found that a brine having a temperature of 90° F. or 100° F. will not produce the desired results.

It also appears that the spraying of an excess of supersaturated water-based brine upon the curds at periodic intervals over an extended period of time is important for the optimum desired results. The application of a brine for a brief period of time, such as is shown in the Brockwell Pat. No. 4,309,941 fails to provide the needed absorption of brine within the curd.

It also appears important for optimum results that the brine be water-based rather than based upon a solution which has solid particles within it, such as a whey brine. A whey brine does not accomplish adequate salt absorption within a reasonable length of time for commercial manufacture. Moreover, bacteria develops within a supply of whey brine. Such bacteria develop gases within the curd and such gases cause undesired cavities in cheeses, such as Cheddar and Colby. For these added reasons, therefore, the production of cheese commercially while using a whey brine has not succeeded.

From the above, it can be seen that I have developed a new and valuable method and apparatus for the manufacture of cheese on a successful commercial basis through the use of brine salting. The advantages of water-based brine salting, if it can be accomplished, are that it provides a more uniform pH, more salt is absorbed by the curd, there is no development of bacteria therein and, therefore, no gas production and open textured cheese, and more whey is removed from the curd. The advantages of brine salting also include the fact that the cheese produced is more uniform and of better flavor and texture, there are no seams within the body of the cheese, no open areas, and no local heavy concentrations of salt such as is experienced when using dry salting and a delayed release creates a heavy salt concentration.

It will, of course, be understood that various changes may be made in the form, details, arrangement and proportions of the parts without departing from the scope of the invention which consists of the matter shown and described herein and set forth in the appended claims.

What is claimed is:

1. A method of continuously producing cheddar cheese consisting of:
   (a) producing a slurry of mixed cheese curd and whey;
   (b) separating the major portion of the whey from said curds while continuously discharging said curds upon one end portion of a power-driven elongated endless first conveyor and carrying the curd thereon for approximately 45 minutes to the opposite end portion of the conveyor while the curd mats, fuses and drains;
   (c) continuously transferring said fused curds from said first conveyor onto a second power-driven elongated endless conveyor and cheddaring and draining said curds on said second conveyor for approximately 40-45 minutes;
   (d) thereafter, milling the cheddared curds into small discrete pieces;
   (e) continuously transferring said milled discrete pieces of cheese curd onto a third endless conveyor for salting and mellowing and continuously transporting said pieces of curd on said third conveyor at a uniform speed from its front end portion across to its rear end portion such that said transporting is for a period of time approximating 30 minutes, during which time said discrete pieces of curd are periodically sprayed over a period of time of between approximately 14 and 20 minutes with an excess of saturated water-based brine having a temperature of approximately 80° F. and a pH of approximately 5.1 to obtain curd pieces having approximately 60% to 70% salt retention within the curd; said pieces of curd being sprayed with a continuous sheet of brine spray at each of a plurality of locations spaced periodically along at least substantially the front half of the third conveyor;

(f) agitating said discrete pieces of curd at periodic intervals while upon that third conveyor to distribute the brine more uniformly therethrough;

(g) maintaining the temperature of the curd throughout each of steps (c)–(f) inclusive, at approximately 98° F.; and (h) thereafter transferring said salted pieces of curd into a container for consolidation into a block of cheese.

2. The method defined in claim 1, wherein the spraying of saturated water-based brine is effected at five separate locations along the front half of the third conveyor, and wherein most of said locations are disposed approximately six feet apart.

3. The method defined in claim 1, wherein said sprayed brine is devoid of solid particles.

4. The method defined in claim 1, wherein the sprayed brine is comprised of salt, water and muriatic acid.

5. The method defined in claim 1, wherein the brine is sprayed uniformly upon the curd in amounts of approximately eighteen gallons of brine per 1000 lbs. of cheese curd.

6. The method defined in claim 1, wherein the brine is last sprayed upon the curd at a point approximately two-thirds of the way along its course of travel on the third conveyor.

7. The method defined in claim 1, wherein the sprayed brine is comprised of salt, water and an acid suitable for use in the manufacture of cheese.

8. The method defined in claim 1, wherein the brine is sprayed upon the curd at five different locations approximately six feet apart and at a collective rate of approximately four gallons per minute.

9. The method defined in claim 1, wherein the curd is carried past each of said locations in layer form approximately five feet in width and in amounts of approximately 220 lbs. per minute.

10. The method defined in claim 1, wherein the brine is sprayed upon the discrete pieces of curd in amounts of approximately 18 gallons per 1000 lbs. of curd.

11. The method defined in claim 1, wherein the brine is sprayed upon the discrete pieces of curd at at least four locations spaced approximately six feet apart at a collective rate of approximately eighteen gallons per 1000 lbs. of curd.

12. The method defined in claim 1, wherein the brine is sprayed upon the curd initially at a location approximately six feet from the front end of the conveyor.

13. The method defined in claim 1, wherein the curd is sprayed uniformly with the brine at a uniform rate at each of the spraying locations.

14. The method defined in claim 1, wherein the curd is sprayed with the brine at locations spaced along substantially the front two-thirds of the third conveyor.

15. The method defined in claim 1, wherein the curd is initally sprayed with brine approximately three minutes after it reaches the third conveyor.

16. The method defined in claim 1 wherein the curd is sprayed with the brine at locations spaced substantially equidistantly.

17. Cheese making apparatus comprising:

(a) fixed curd and whey receiving and separating means constructed and arranged to receive a slurry of curd and whey therein and to separate the curd from the major portion of the whey;

(b) power-driven first continuous conveyor means mounted in curd and whey receiving relation relative to said curd and whey receiving and separating means, and constructed and arranged to carry the curd for a substantial period of time approximating forty-five minutes, to permit most of the curd to separate from the remaining whey moving with said conveyor means and to fuse and mat into a mat of curd upon said conveyor means;

(c) power-driven second continuous conveyor means mounted in curd-receiving relation relative to said first conveyor means and being constructed and arranged to carry the curd received thereon for a substantial period of time approximating forty minutes as the matted curd cheddars and drains;

(d) a powered milling device mounted in curd-receiving relation relative to said second conveyor means and receiving the cheddared curd therefrom and being constructed and arranged to mill such cheddared curd into small discrete pieces;

(e) third power-driven continuous conveyor means mounted in curd-receiving relation relative to said milling device and receiving its milled curd thereon in layer form and being constructed and arranged to carry the milled curd in layer form and at a uniform speed for a substantial period of time approximating thirty minutes to a remote location for discharge into containers, said third conveyor having front and rear halves;

(f) a series of sets of brine sprayers positioned above said third conveyor means and disposed at spaced locations along substantially the entire front half of said third conveyor means and constructed and arranged to spray saturated water-based brine in continuous sheet form at spaced locations upon the milled curd at substantially regular intervals along the front half of said third conveyor means over on extended period of time approximating 14–20 minutes, while the curd moves on the third conveyor means; and (g) a plurality of powered rotatable agitators mounted above said third conveyor means in position to engage and agitate the milled curd disposed upon the upper surface of said third conveyor means as they rotate, said agitators being spaced along the length of said third conveyor means.

18. The structure defined in claim 17, and (h) said brine sprayer sets being at least four in number and spaced longitudinally of said third conveyor means approximately six feet apart.

19. The structure defined in claim 17, and (h) said sets of brine sprayers being connected to a source of saturated water-based brine having a temperature of approximately 80° F., a pH of approximately 5.1 and being under pressure of approximately 5–10 p.s.i.

20. The structure defined in claim 17, and (h) said sets of brine sprayers being connected to a source of saturated water-based brine having a temperature of approximately 80° F., a pH of approximately 5.1, and being under pressure of approximately 5–10 p.s.i. and having brine discharging openings of such size as to cause saturated brine to be sprayed upon such milled curd as it moves with said third conveyor at a collective rate of approximately four gallons per minute.

21. The structure defined in claim 17, and
(h) said brine sprayers being connected to a source of saturated water-based brine under pressure having a temperature of approximately 80° F. and a pH of approximately 5.1 and having brine discharging openings of a size such as to spray saturated brine upon the curd carried by said third conveyor at spaced locations at a collective rate of approximately eighteen gallons of brine per 1000 lbs. of curd carried by said third conveyor.

22. The structure defined in claim 17, and
(h) said brine sprayers being spaced approximately equidistantly.

23. The structure defined in claim 17, and
(h) said third conveyor means being approximately sixty feet long and constructed and arranged to travel at a uniform rate of about 60 feet in 30–35 minutes.

24. The structure defined in claim 17, and
(h) said brine sprayers sets being spaced approximately equidistantly and being at least four in number and each being connected to a source of saturated brine having a temperature of approximately 80° F., a pH of about 5.1, and being under pressure of about 5–10 p.s.i., each of the first four of said sets of sprayers having orifices such as to spray approximately one gallon per minute of said saturated brine upon the curd carried by said third conveyor means.

25. The structure defined in claim 17 wherein each of said conveyor means has a perforated stainless steel belt for carrying the curd as it is matted, cheddared, salted and mellowed.

26. The structure defined in claim 17 and valve control means connected to said brine sprayers and constructed and arranged to cut off the flow of brine therefrom whenever there is no curd carried by the conveyor associated therewith.

27. The structure defined in claim 17 and valve control means connected to said brine sprayers in spray-controlling relation, said control means being sensitive to the presence of curd upon the conveyor associated therewith and being constructed and arranged to cut off the flow of brine from said sprayers whenever there is no curd caried by the conveyor associated therewith.

28. The structure defined in claim 17 wherein said brine sprayers are disposed at locations spaced across the major portion of the entire length of said third conveyor means.

* * * * *